US009225641B2

(12) United States Patent
Kaneriya et al.

(10) Patent No.: US 9,225,641 B2
(45) Date of Patent: Dec. 29, 2015

(54) COMMUNICATION BETWEEN HETROGENOUS NETWORKS

(71) Applicant: GLOBALFOUNDRIES Inc., Grand Cayman (KY)

(72) Inventors: Rupal A. Kaneriya, Fremont, CA (US); Ashish Kapur, Santa Clara, CA (US); Vishal Shukla, Santa Clara, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 157 days.

(21) Appl. No.: 14/067,750

(22) Filed: Oct. 30, 2013

(65) Prior Publication Data

US 2015/0117451 A1  Apr. 30, 2015

(51) Int. Cl.
  *H04L 29/06* (2006.01)
  *H04L 12/741* (2013.01)
  *H04L 12/66* (2006.01)
  *H04L 12/721* (2013.01)
  *H04L 12/715* (2013.01)
  (Continued)

(52) U.S. Cl.
  CPC ............... *H04L 45/745* (2013.01); *H04L 12/66* (2013.01); *H04L 45/02* (2013.01); *H04L 45/38* (2013.01); *H04L 45/54* (2013.01); *H04L 45/64* (2013.01); *H04L 69/08* (2013.01); *H04L 61/103* (2013.01)

(58) Field of Classification Search
  CPC . H04L 29/06068; H04L 45/745; H04L 12/66; H04L 45/02; H04L 45/38; H04L 45/54; H04L 45/64; H04L 61/103; H04L 69/08
  USPC .......................... 370/351, 389, 392
  See application file for complete search history.

(56) References Cited

U.S. PATENT DOCUMENTS

2011/0267954 A1*  11/2011  Seetharaman et al. ........ 370/241
2012/0005371 A1    1/2012  Ravindran et al.
2012/0250496 A1    10/2012  Kato
(Continued)

OTHER PUBLICATIONS

Feng, T., Bi, J. & Hu, H. (2011). OpenRouter: Openflow extension and implementation based on a commercial router. 19th IEEE International Conference on Network Protocols. 141-142. Doi: 10.1109/ICNP.2011.6089045.
(Continued)

*Primary Examiner* — Chi H Pham
*Assistant Examiner* — Robert Lopata
(74) *Attorney, Agent, or Firm* — Anthony Canale; Andrew M. Calderon; Roberts, Mlotkowski, Safran & Cole PC

(57) ABSTRACT

A system to communicate between a first network and a second network includes a first network, a second network, and a connecting device connected there between. The first network has a first network protocol and includes a plurality of network nodes. The second network has a second protocol different from the first protocol and includes a plurality of network switches and a controller. The connecting device transmits data from an originating network node to a destination network switch and transmits data from an originating network switch to a destination network node according to a packet routing table populated from the plurality of network nodes and a packet flow table populated from the plurality of network switches. The controller may determine the destination network switch by constructing and transmitting an ARP broadcast message to the plurality of network switches and receiving an ARP response from the destination network switch.

19 Claims, 10 Drawing Sheets

(51) Int. Cl.
*H04L 12/751* (2013.01)
*H04L 29/12* (2006.01)

(56) References Cited

U.S. PATENT DOCUMENTS

| | | |
|---|---|---|
| 2013/0039214 A1 | 2/2013 | Yedavalli et al. |
| 2013/0054761 A1 | 2/2013 | Kempf et al. |
| 2013/0094350 A1 | 4/2013 | Mandal et al. |
| 2013/0144973 A1 | 6/2013 | Li et al. |
| 2013/0170495 A1* | 7/2013 | Suzuki et al. ............... 370/392 |
| 2013/0223440 A1* | 8/2013 | DeCusatis et al. ........... 370/388 |
| 2013/0332619 A1* | 12/2013 | Xie et al. ..................... 709/230 |
| 2014/0254373 A1* | 9/2014 | Varma .......................... 370/235 |
| 2014/0269415 A1* | 9/2014 | Banavalikar et al. ........ 370/254 |
| 2014/0269599 A1* | 9/2014 | Witzel et al. ................. 370/329 |
| 2014/0286336 A1* | 9/2014 | Narayanan et al. .......... 370/392 |

OTHER PUBLICATIONS

Shimonishi, H., Ishii, S., Sun, L. et al. (Oct. 2011). Architecture, implementation, and experiments of programmable network using openflow. IEICE Transactions on Communications.E94-B(10). 2715-2722.

* cited by examiner

COMMUNICATION BETWEEN HETROGENOUS NETWORKS

FIELD

Embodiments of invention generally relate to networking, and more specifically relate to data communication between existing L2/L3 protocol networks, such as OSPF, and Software Defined Networks (SDN), such as OpenFlow protocol networks.

DESCRIPTION OF THE RELATED ART

Currently, in enterprise network deployments, various network protocols such as L2/L3 may be used. An exemplary L2/L3 network is an Open Shortest Path First (OSPF) network. OSPF is an interior gateway protocol that routes Internet Protocol (IP) packets within a single routing domain. Link state information is gathered from available routers and constructs a topology map of the network. The topology determines the routing table presented to the Internet Layer which makes routing decisions based solely on the destination IP address found in IP packets.

Simultaneously, there is an industry wide push for new enterprise network deployments to utilize SDN protocols such as OpenFlow, an open communications protocol. OpenFlow allows the path of network packets through the network of switches to be determined by software running on multiple routers, servers, etc. This separation of the control from the forwarding allows for more sophisticated traffic management. One of the goals of OpenFlow is to move network control out of proprietary network switches and into control software that's open source and locally managed.

As an enterprise network grows, the number of network areas increase. The network may be grown homogenously with the additional areas utilizing similar network protocol(s). However, in some cases the added network may utilize different routing protocol(s) than the existing protocol(s). Many complications exist when the added network areas utilize a different protocol from those that exist.

One particular complication is that many L2/L3 networks cannot be extended with an SDN network. If it is desired for an existing L2/L3 network to expand, the new network areas must operate under an L2/L3 protocol, or the entire network has to be rebuilt as an SDN. This will come with huge cost, as the existing switches will need to be replaced with SDN functional switches. Accordingly, there is a need for improvements in the connection and communication between existing L2/L3 networks, such as an OSPF network, to a SDN, such as an OpenFlow network.

SUMMARY

In a first embodiment, a system to communicate between a first network and a second network includes a first network a second network and a connecting device connected to the first network and second network. The first network has a first network protocol and includes a plurality of network nodes. The second network has a second protocol different from the first protocol and includes a plurality of network switches and a controller. The connecting device transmits data from an originating network node to a destination network switch and transmits data from an originating network switch to a destination network node according to a packet routing table populated from the first network and a packet flow table populated from the second network.

In another embodiment, a method for transmitting data from a first network to a second network includes populating the packet routing table with one or more nodes comprised within the first network; populating the packet flow table with one or more switches comprised within the second network; transmitting a packet from an originating network node to the connecting device; querying, with the connecting device, the packet flow table to determine a destination network switch; and transmitting the packet from the connecting device to the destination network switch.

In another embodiment, a computer program product for communicating from the first network to a second network includes a computer readable storage medium having program code embodied therewith that is executable to: populate the packet routing table with the one or more nodes; populate the packet flow table with one or more switches; transmit a packet from the originating network node to the connecting device; query, with the connecting device, the packet flow table to determine the destination network switch; and transmit the packet from the connecting device to the destination network switch.

In certain embodiments the controller determines the destination network switch by constructing and transmitting an Address Resolution Protocol (ARP) broadcast message to the one or more network switches within the second network and receiving an ARP response from the destination network switch.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
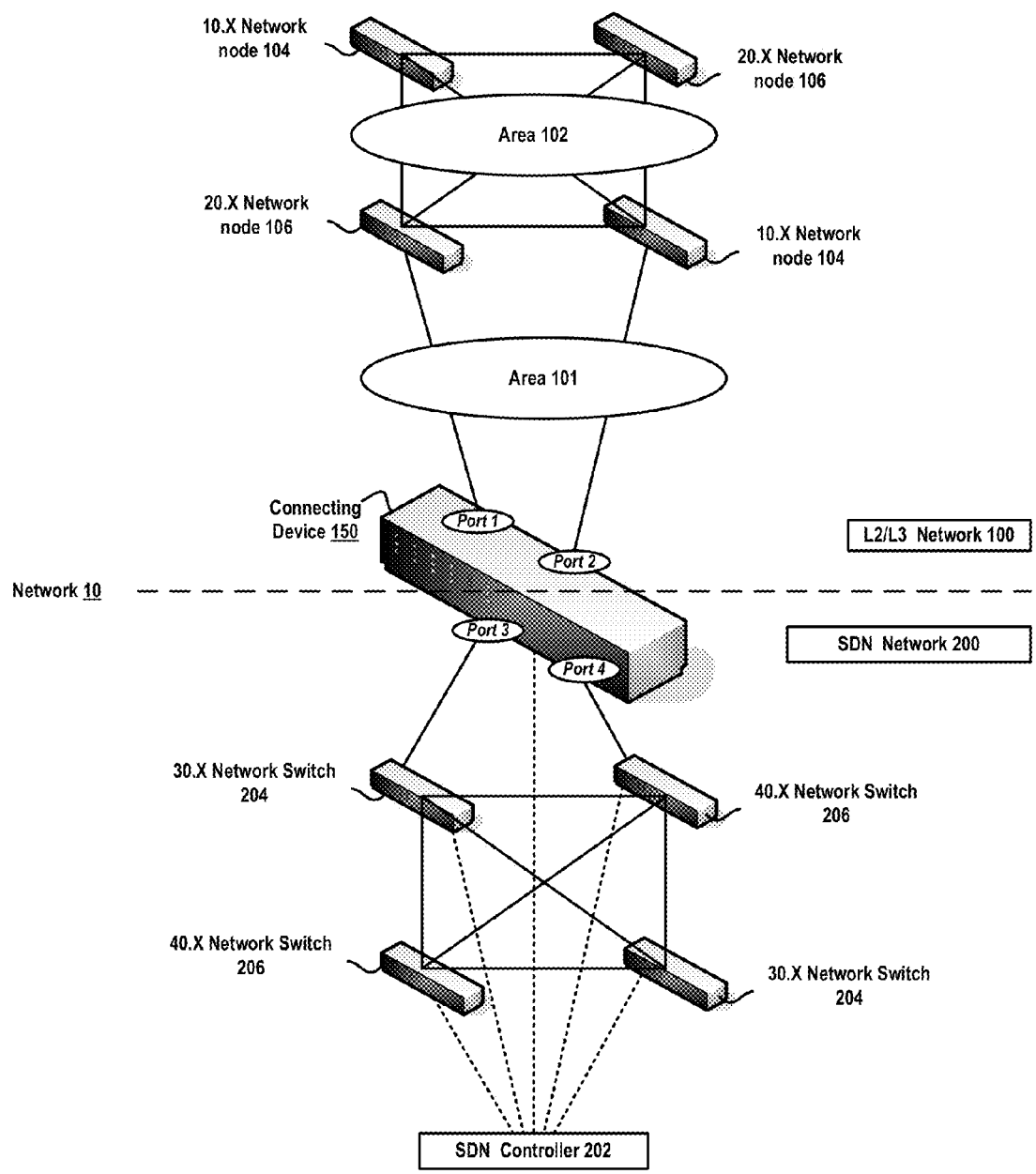
FIG. 1 depicts an exemplary network scheme that connects an L2/L3 network to an SDN via one or more connecting devices, according to various embodiments of the present invention.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts an exemplary network 10 comprising an L2/L3 Network 100, such as an OSPF network, to an SDN 200, such as an OpenFlow network, via one or more connecting device(s) 150, according to various embodiments of the present invention. In various exemplary embodiments, network 10 comprises one or more L2/L3 network nodes (e.g. switches, routers, network area 101, network area 102, etc.) and one or more SDN switches (e.g. nodes, routers, 10.x Network 104, 20.x Network 106, etc.) connected either directly or indirectly to the connecting device 150.

In various exemplary embodiments, the SDN 200 includes an SDN controller 202 that manages packet flow through the SDN 200. In certain embodiments, SDN controller 202 may be comprised within a router, computer, server, host, etc. SDN Network 200 also includes various switches (e.g. nodes, routers, 30.x Network switch 204, 40.x Network switch 206, etc.) connected either directly or indirectly to the connecting device 150. To effectively manage packet flow through the SDN 200, SDN controller 202 is also connected to each SDN switch. In certain embodiments SDN controller(s) 202 are OpenFlow controller(s). The number of devices, components, networks, etc. depicted in FIG. 1 is for illustration purposes only. It should be understood that, for example, additional connecting devices 150, 10.x Networks 104, 20.x Networks 106, 30.x Network switches 204, 40.x Network switches 206, SDN controllers 202, etc. may be implemented or utilized.

The exemplary network 10 of FIG. 1 may be utilized to extend an existing L2/L3 network 100 with a SDN 200. In certain embodiments, the existing L2/L3 network 100 may stay as-is and any newly added device to network 10, data center, enterprise network, etc. may be an SDN functional device. This may be accomplished, generally, by connecting L2/L3 network 100 to SDN 200 via connecting device 150 that understands and may implements both L2/L3 and SDN protocols. In certain embodiments, connecting device 150 understands and implements OSPF and OpenFlow protocols.

In certain embodiments, through connecting device 150, the L2/L3 network 100 will perceive the SDN 200 as an autonomous system (AS) and perceive connecting device 150 as an Autonomous System Boundary Router (ASBR). In turn, SDN 200 will perceive L2/L3 network 100 as a large domain that includes many switches and networks.

Generally within network 10, a packet may be routed entirely within the L2/L3 network 100 (e.g. the packet is to be routed from 10.x to 20.x, etc.). In this circumstance, the packet will be routed utilizing solely L2/L3 protocol methodologies. Similarly, when the packet is to be routed entirely within SDN 200, the packet will be processed solely with appropriate SDN methodologies.

It is more complex, however, when the packet is to be routed from L2/L3 network 100 to SDN network 200, or visa versa (e.g. packet flow from 10.x to 30.x, 40.x to 20.x, etc.). The connecting device 150 understands and implements both L2/L3 and SDN protocols and therefore may manage such complex packet routing. One particular complexity managed by connecting device 150 and SDN controller 202 allows SDN controller 202 to know or recognize L2/L3 network 100 routes. Another complexity managed by connecting device 150 and SDN controller 202 allows L2/L3 networks to know or recognize SDN routes. Managing updates to packet routes between L2/L3 network 100 and SDN 200 is one further complexity managed by connecting device 150 and SDN controller 202.

Figures 14, 15, 16:
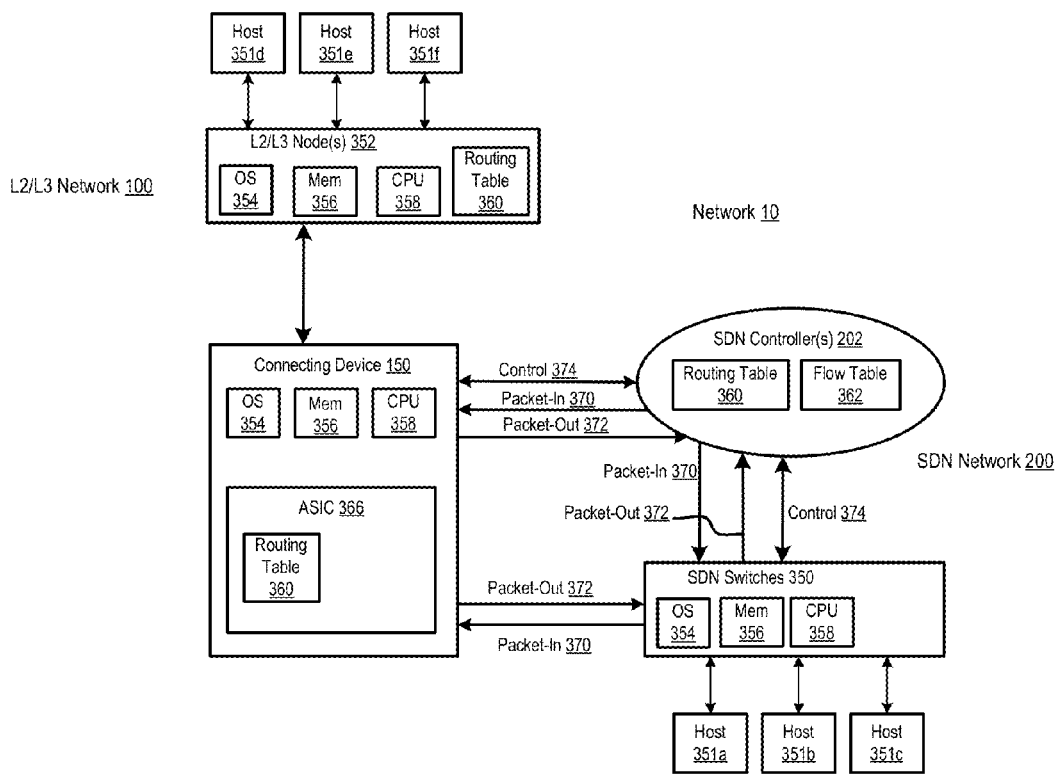
FIG. 14 depicts an exemplary SDN packet routing table, according to various embodiments of the present invention.
FIG. 15 depicts an exemplary multicast/unicast address that informs connecting device to look into the packet routing table for an existing route, according to various embodiments of the present invention.
FIG. 16 depicts an exemplary network architecture that connects a L2/L3 network to an SDN via one or more connecting device(s), according to various embodiments of the present invention.

FIG. 16 depicts an exemplary network 10 architecture that connects an L2/L3 network 100 to an SDN network 200 via one or more connecting device(s) 150, according to various embodiments of the present invention. In various exemplary embodiments, the L2/L3 network 100 includes various interconnected L2/L3 nodes 352 connected either directly or indirectly to the connecting device 150. L2/L3 nodes 352 may route data packets from one L2/L3 node 352 to another L2/L3 node 352 and routes data from an L2/L3 node 352 to connecting device 150 (or visa versa). In certain embodiments, one or more hosts 351 are communicatively connected to one or more L2/L3 nodes 352.

In various exemplary embodiments, the SDN 200 includes various interconnected SDN switches 350 connected either directly or indirectly to the connecting device 150. SDN switches 350 route packets from one SDN switch 350 to another SDN switch 350 via packet-in and packet-out messages and routes data packets from a SDN switch 350 to connecting device 150 via packet-in 370 and packet-out 372 (or visa versa). Connecting device 150 and SDN switches 350 may be connected to one or more SDN controllers 202 via control 374 for routing management messages, packet-in 370, and packet-out 372. In certain embodiments, one or more hosts 351 are communicatively connected to one or more SDN switches 350.

An L2/L3 node 352, connecting device 150, and/or SDN switch 350 may include a central processing unit (CPU) 358 and memory 356. CPU 358 may be any known device that carries out the instructions of a program (e.g. operating system 354, other logic modules, etc.) by performing the basic arithmetical, logical, and input/output operations. L2/L3 node 352 may have more than one CPU 358 (e.g. multiprocessor, multi-core processors, etc.). CPU 358 may include an arithmetic logic unit (ALU), which performs arithmetic and logical operations, and the control unit, which extracts instructions from memory 356 and decodes and executes the instructions, calling on the ALU when required. Memory 356 may be any known storage device that allows for data to be stored and accessed by CPU 358. Memory 356 may be RAM (e.g. SRAM, ROM, OTP, NOR flash, etc.), SRAM, DRAM, or other such equivalents used in association with CPU 358.

In certain embodiments of the present invention, the connecting device 150 may include an SDN & L2/L3 application specific integrated circuit (ASIC) 366. In certain embodiments ASIC is an OpenFlow and OSPF ASIC. ASIC 366 may be a microprocessor, memory blocks including ROM, RAM, EEPROM, flash memory, a system-on-chip, FPGA, programmable logic blocks, etc. In certain embodiments, ASIC 366 is distinct from CPU 358 within connecting device 150. In alternative embodiments, ASIC 366 as is functionality described herein may be carried out by CPU 358 within connecting device 150.

ASIC 366 may include a packet routing table 360 and a packet flow table 362, in accordance with various embodiments of the present invention. The packet routing table 360 may provide the transmission, mapping, or routing information for routing packets within L2/L3 network 100. In certain embodiments, packet routing table 360 may also be included in other L2/L3 nodes 352 and/or SDN controller(s) 202.

The packet flow table 362 may provide the transmission, mapping, or routing information for routing packets within SDN network 200. In certain embodiments, packet flow table 362 may also be included in other SDN switches 350 and/or SDN controller(s) 202.

In certain embodiments, packet routing table 360 and packet flow table 362 are distinct tables as is shown in FIG. 16. In other embodiments, packet routing table 360 and packet flow table 362 may be a single integrated table.

Figure 2:
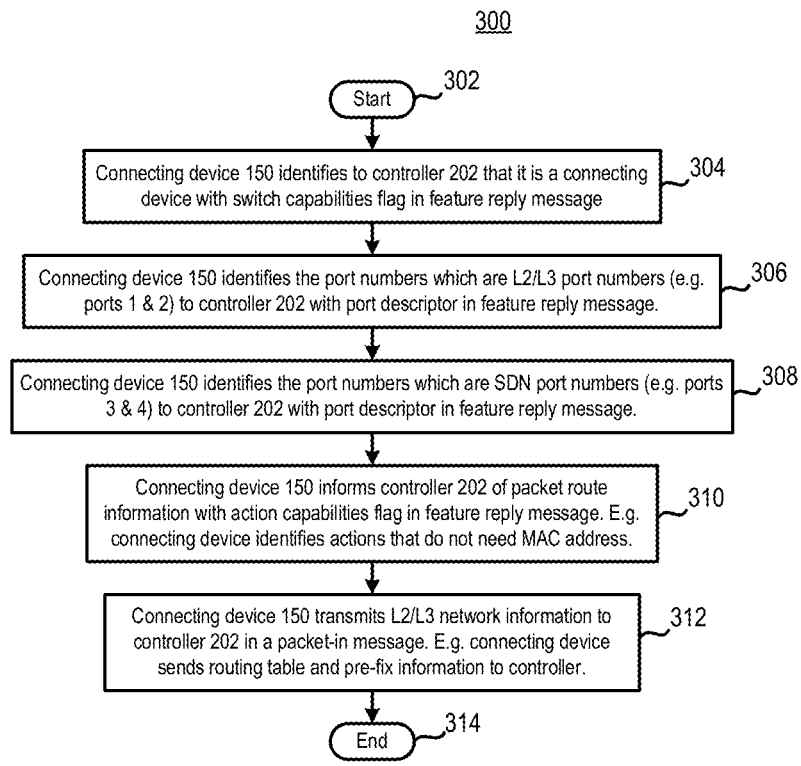
FIG. 2 depicts a flow diagram of a process for communicating L2/L3 network information to an SDN controller such that an SDN will know, recognize, or otherwise have the ability to route packets to the L2/L3 network, according to various embodiments of the present invention.

FIG. 2 depicts a flow diagram of a process 300 for communicating L2/L3 network information to SDN controller 202 such that SDN 200 will know, recognize, or otherwise have the ability to route packets to L2/L3 network 100, according to various embodiments of the present invention. Connecting device 150 may be included in area 101 within OSPF network 100 and because it is configured as ASBR, it will have packet route information for the entire L2/L3 network 100 (e.g. packet routing table 360, etc.). According to embodiments of process 300, L2/L3 network 100 route information may be shared with SDN controller 202.

Process 300 begins at block 302 and continues upon the connecting device 150 recognizing an SDN controller 202. Upon recognition, connecting device 150 communicates to the SDN controller 202 that it is a special switch (e.g. it is connecting device 150) utilizing a switching capabilities flag in feature reply message (block 304). Process 300 may continue with connecting device 150 identifying its L2/L3 port numbers (e.g. ports 1 and 2) (block 306) and identifying its SDN port numbers (e.g. ports 3 and 4) (block 308) to SDN controller 202 utilizing port descriptors in feature reply messages, respectively. Process 300 may continue with connecting device 150 informing SDN controller 202 of packet route information with an action capabilities flag in feature reply message (block 310). For example, connecting device 150 identifies actions that do not need or have associated MAC addresses. Process 300 may continue with connecting device 150 transmitting L2/L3 network information to SDN controller 202 in a packet-in message (block 312). For example, connecting device 150 sends packet routing table 360 to SDN controller 202. Block 312 will generally communicate to SDN controller 202 the information for it to learn about L2/L3 network 100, L2/L3 nodes 352, etc. Block 312 may be a triggered event such that the information is sent to SDN controller 202 only after a predetermined event and/or only after a predetermined time interval has lapsed. For example, SDN controller 202 may poll for a most recent packet routing table 360 at predefined time intervals. Upon receipt of the L2/L3 network information, SDN controller 202 is able to install a route for data packet transfer from an SDN switch 350 to a L2/L3 destination (e.g. L2/L3 node 352, etc.).

Figure 3:
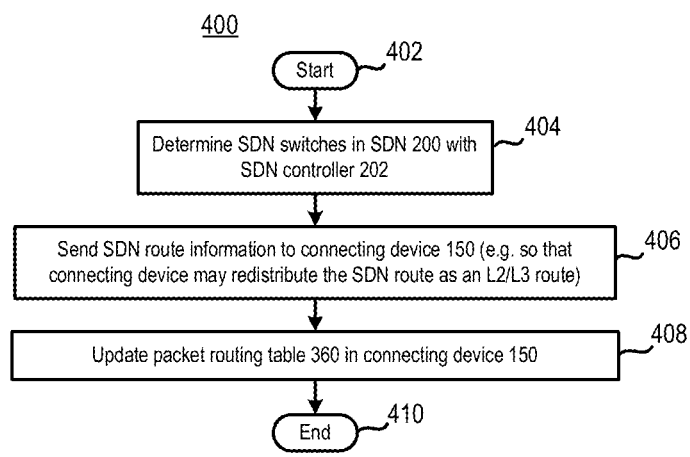
FIG. 3 depicts a flow diagram of a process for communicating SDN information to an L2/L3 network such that L2/L3 network will know, recognize, or otherwise have the ability to route packets to the SDN, according to various embodiments of the present invention.

FIG. 3 depicts a flow diagram of a process 400 for communicating SDN 200 information to L2/L3 network 100 such that L2/L3 network 100 will know, recognize, or otherwise have the ability to route packets to SDN 200, according to various embodiments of the present invention.

Process 400 begins at block 402 and continues with SDN controller 202 determining the SDN switches 350 within an SDN network 200 (block 404). For example, a OpenFlow controller determines the number, identity, etc. of each OpenFlow switch within an OpenFlow network. In a first embodiment, SDN controller 202 may have previously assembled such information. Generally, as soon as an SDN switch 350 comes up or becomes active, SDN controller 202 will know what SDN switch 350 ports are edge ports, etc. making that SDN switch 350 identifiable. SDN controller 202 may send a packet-out to those switches 350 with a probe to get each switch's 350 IP address. Upon each switch's 350 reply, SDN controller 202 may assemble the list of all SDN switches 350, associated IP addresses, etc. within SDN network 200. Generally, because this process may occur when SDN switch 350 comes up, the SDN controller 202 may have a current list of SDN switches 350.

Process 400 continues with SDN controller 202 sending SDN route information to connecting device 150 with a packet-out (block 406). The connecting device will process the payload of the packet-out and will install the SDN route as a redistributed L2/L3 route. Process 400 continues with updating the packet flow table 362 in connecting device 150 (block 408). In this way, other L2/L3 nodes 352 may subsequently utilize the packet flow table 362 to redistribute an L2/L3 route within SDN network 200 to transmit originating L2/L3 packets to SDN 200.

Referring block 404, in another embodiment, SDN controller 202 may not have previously assembled such SDN switch 350 identification information. Therefore, connecting device 150 may become further involved in determining the SDN switches 350 utilizing an ad hock SDN switch 350 identification methodology. In this embodiment, the connecting device 150 advertises a default route into L2/L3 network 100 for SDN 200 destination packets. The default route allows packets coming from L2/L3 network 100 to a SDN 200 destination to route to SDN controller 202 ad packet-in. SDN controller 202 sends an Address Resolution Protocol (ARP) broadcast to all SDN switches 350. Upon receiving the ARP broadcast, the SDN controller 202 identifies the particular IP address, MAC address, SDN switch 350 ID, etc. to which the packet is to be routed. The connecting device 150 may then route the L2/L3 originating packet to the appropriate SDN switch 350. The ARP broadcast return information may be saved by connecting device 150 as apart of the SDN switch 350 identification list for future use. The above process may be repeated as necessary until all of the SDN switches 350 are identified within SDN 200.

Figure 4:
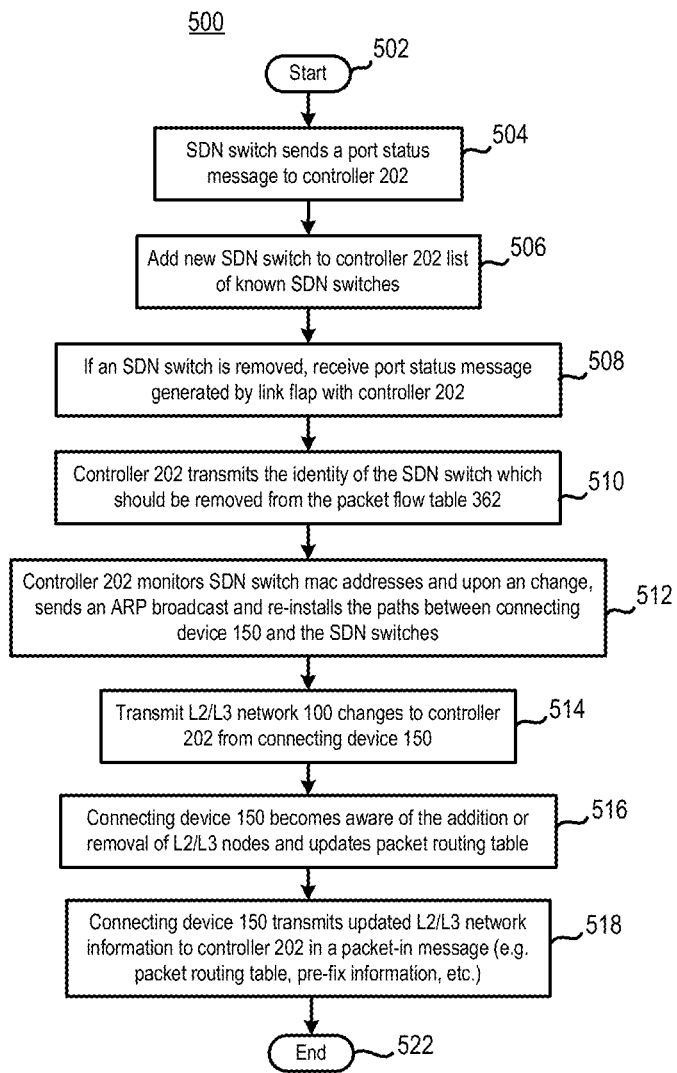
FIG. 4 depicts a flow diagram of a process for managing updates to packet routes between a L2/L3 network and a SDN, according to various embodiments of the present invention.

FIG. 4 depicts a flow diagram of a process 500 for managing updates to packet routes between L2/L3 network 100 and SDN 200 to effectively update route changes (e.g. link flap, new network was added, a network was removed, etc.), according to various embodiments of the present invention. Process 500 begins at block 502. To manage or update route changes or updates within SDN 200, an SDN switch 350 may send a port status message to SDN controller 202 to inform the controller 202 of any changes to a previously existing route (block 504).

If a new SDN network switch 350 is added, the new switch 350 may be added to the SDN controller 202 list of known switches 350, networks, etc. (block 506). For example, when the new switch 350 comes up, SDN controller 202 sees the switch's edge ports and sends a packet-out to the new switch 350 with a probe to obtain the new switch's 350 IP address and adds the new SDN switch 350 to the switch list, etc. Alternatively, the newly added SDN switch 350 may wait for the SDN controller 202 to discover it with the ARP broadcast process described above.

If an SDN switch 350 is removed, deleted, etc., a port status message generated by link flap will be received by SDN controller 202 (block 508), whereby SDN controller 202 transmits the identity of the SDN switch 350 which should be removed from packet flow table 362 in connecting device 150 (block 510).

If an SDN network switch 350 is changed or moved, without flipping it's edge port, the MAC address of the SDN switch 350 will move. The SDN controller 202 may monitor SDN switch 350 MAC addresses and upon an change, the controller 202 may send an ARP broadcast and re-install the path between connecting device 150 and the SDN switch 350 (block 512).

To manage or update route changes or updates within L2/L3 network 100, the appropriate L2/L3 protocol (e.g. OSPF, etc.) are followed and the requisite updates are sent to SDN controller 202 from connecting device 150 (block 514). When an L2/L3 node 352 is added or removed, the connecting device 150 becomes aware of the addition or removal following the appropriate L2/L3 protocol and updates, for example, packet routing table 360 (block 516). In certain embodiments, connecting device 150 may additionally transmit the updated L2/L3 network 100 information to SDN controller 202 in a packet-in message (e.g. packet routing table 360, pre-fix information, etc.) (block 518). Process 500 ends at block 522.

Figure 5:
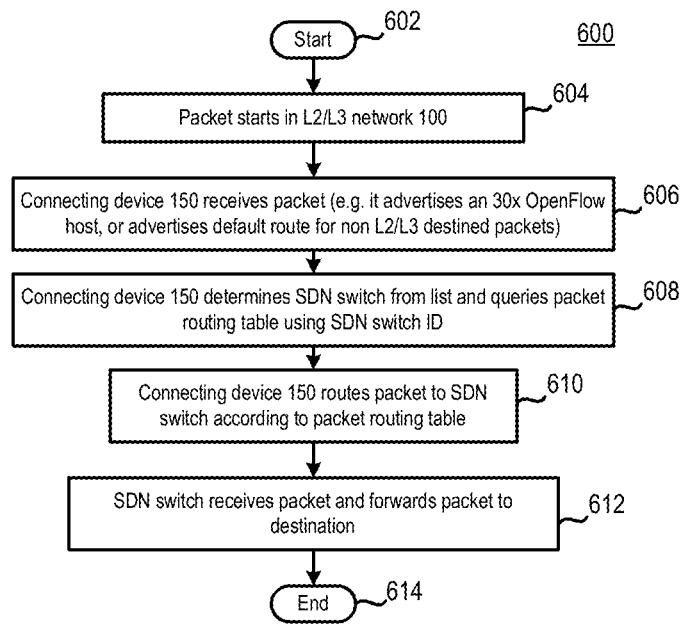
FIG. 5 and FIG. 6 depict exemplary flow diagrams of processes for routing packets between a L2/L3 network and a SDN, according to various embodiments of the present invention.

FIG. 5 depicts an exemplary flow diagram of a process 600 for routing packets between L2/L3 network 100 and SDN 200, according to various embodiments of the present invention. Process 600 begins at block 602 and continues with an L2/L3 packet (e.g. a 10.x packet, 20.x packet, packet from OSPF Node, etc.) that is destined for SDN 200 (e.g. a 30.x switch, a 40.x switch, etc.) (block 604). Connecting device 150 receives the L2/L3 packet by advertising an SDN 200 route (e.g. it advertises a 30.x switch) or by advertising a default route for L2/L3 packets that are destined for SDN 200 (block 606). For example, connecting device 150 advertises a default route from L2/L3 node 352 to connecting device 150 for non L2/L3 destined packets. The packet is received on the dedicated L2/L3 port of connecting device 150 (e.g. port 1 or port 2).

Connecting device 150 receives the packet and determines the SDN switch 350 for packet routing via a query of SDN switch 350 list, etc. (block 608). For example, connecting device 150 receives the packet and identifies that destination SDN switch 350 from its list of SDN switches. Once the destination switch 350 is identified, connecting device 150 may query packet flow table 362 to determine the route the packet should be sent. Connecting device 150 then routes the packet to a destination SDN switch 350 according to the packet routing table 360 (block 610). The receiving SDN switch 350 may be the final destination for the packet. If so, the SDN switch 350 receives and processes the packet accordingly (block 612). If the receiving SDN switch 350 is not the final destination, the receiving SDN switch 350 forwards the packet via the route as implemented by SDN controller 202. Process 600 ends at block 614.

Figure 6:
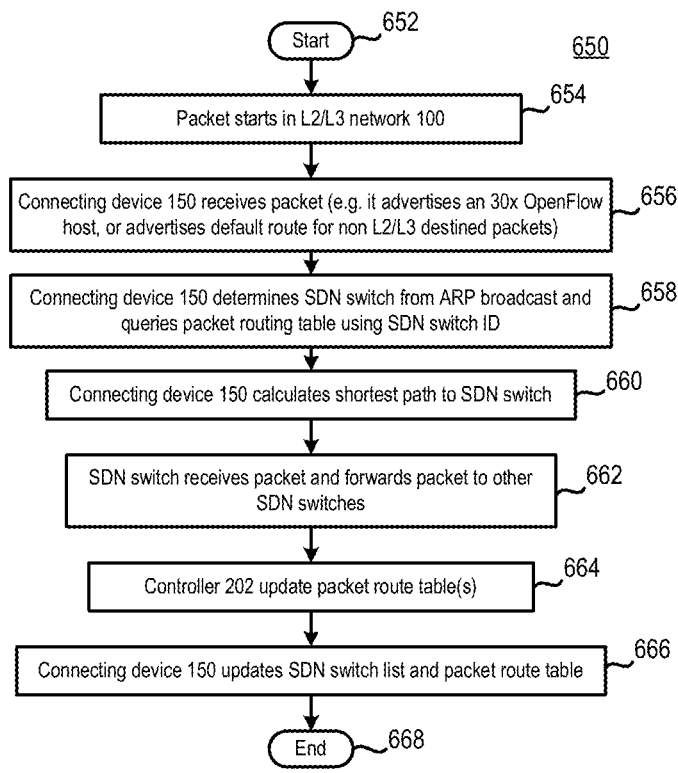

FIG. 6 depicts an alternative exemplary flow diagram of a process 650 for routing packets from L2/L3 network 100 to SDN 200, according to various embodiments of the present invention. Process 650 begins at block 652 and continues with an L2/L3 originating packet that is destined for SDN 200 (block 654). Connecting device 150 receives the packet by advertising an SDN 200 route (e.g. it advertises a destination SDN switch 350) or by advertising a default route for packets that destined for SDN 200 (block 656).

Connecting device 150 receives the packet and determines a destination SDN switch 350 to receive the packet via an ARP broadcast (block 658). For example, connecting device 150 send the packet-In to SDN controller 202 whereby the SDN controller 202 sends an ARP broadcast to SDN network 200 to discover the IP address, OpenFlow switches 350, etc. Once, the proper destination switch 350 is identified, the connecting device 150 may query its packet routing flow table 362 to determine the route the packet should be sent. In some embodiments, SDN controller 202 may calculate a shortest route to the destined OpenFlow switch 350 (block 660). Connecting device 150 then routes the packet to the destination SDN switch 350 according the packet routing table along the determined shortest path. In some embodiments, the receiving SDN switch 350 may be the desired destination for the packet. If so, the SDN switch 350 receives and processes the packet accordingly (block 662). If the receiving SDN switch 350 is not the final destination, the receiving SDN switch 350 forwards the packet utilizing similar methodology as described above. The OpenFlow controller 202 may update packet routing table 360, packet flow table 362, etc. for future processing (block 664). Likewise, connecting device 150 may update packet routing table 360, packet flow table 362, etc. for future use (block 666). Process 650 ends at block 668.

Figure 7:
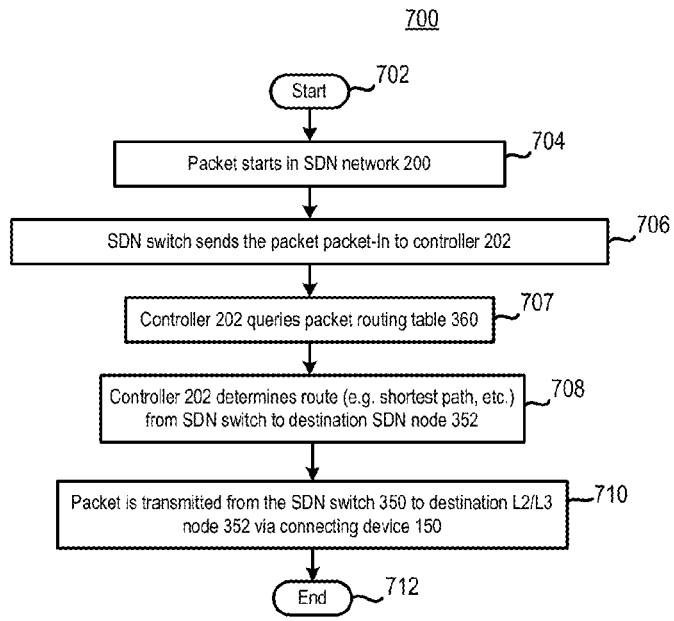
FIG. 7 depicts an exemplary flow diagram of a process for routing packets between a SDN and a L2/L3 network, according to various embodiments of the present invention.

FIG. 7 depicts an exemplary flow diagram of a process 700 for routing packets from SDN 200 to L2/L3 network 100, according to various embodiments of the present invention. Process 700 begins at block 702 and continues with an SDN packet (e.g. a 30.x packet, 40.x packet, OpenFlow switch packet, etc.) that is destined for L2/L3 network 100 (block 704). The SDN switch 350 associated with the packet destined for L2/L3 network 100 will send the packet packet-In to SDN controller 202 (block 706). For example, the moment the packet destined to a L3/L3 node 352 comes to SDN switch 350, SDN switch 350 will send the packet-In to connecting device 150. SDN controller 202 then queries the L2/L3 network information previously obtained from connecting device 150 (block 707) to determine a destination L2/L3 network, destination L2/L3 node 352, etc. For example, SDN controller 202 queries the packet routing table 360 to determine destination L2/L3 node 352. SDN controller 202 may then calculate the route from the SDN switch 350 to destination L2/L3 node 352 via connecting device 150 (e.g. shortest path, etc.) (block 708). The packet is transmitted from the SDN switch 350 to the destination L2/L3 node 352 via connecting device 150. (block 710). Process 700 ends at block 712.

In various embodiments, Internet Group Management Protocol and Protocol-Independent Multicast can be implemented in network 10 where a rendezvous point can be defined in SDN controller 202 from the known routes using the route visibility it has from connecting device 150 and the knowledge of it's own SDN switches 350.

Figure 8:
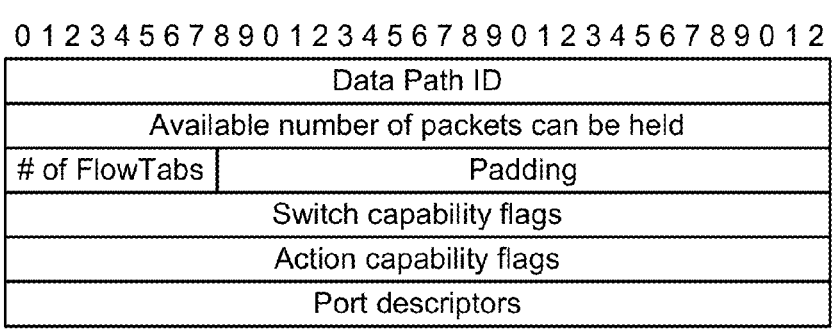
FIG. 8 depicts an exemplary feature reply message, according to various embodiments of the present invention.
Figure 9:
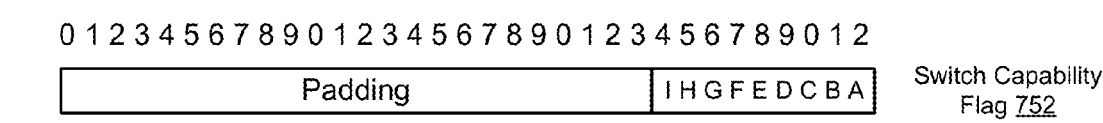
FIG. 9 depicts an exemplary switch capability flag, according to various embodiments of the present invention.

In certain embodiments, for data flow from SDN 200 to L2/L3 network 100 a control path from L2/L3 network 100 to SDN 200 is implemented. First, connecting device 150 will establish an SDN (e.g. OpenFlow, etc.) connection with SDN controller 202. Connecting device 150 will inform the SDN controller 202 that it is, for example, an edge device which works in traditional L2/L3 protocols and in SDN protocols. This will be communicated to the SDN controller 202 using, for example, a feature reply message, where the switch capability flag is active, according to various embodiments of the present invention. An exemplary feature reply message 750 is depicted in FIG. 8. More specifically, an exemplary switch capability flag within the feature reply message 750 may be modified to add a new bit 'I.' An exemplary switch capability flag 752 with an added bit 'I' is shown in FIG. 9. When 'I' is active, connecting device 150 may, for example, be identified and function as an edge device (i.e. connecting device 150) between L2/L3 network 100 and SDN network 200. When 'I' is not active, connecting device 150 is not set as the special edge device and will therefore function as a normal SDN switch 350.

Figure 10:
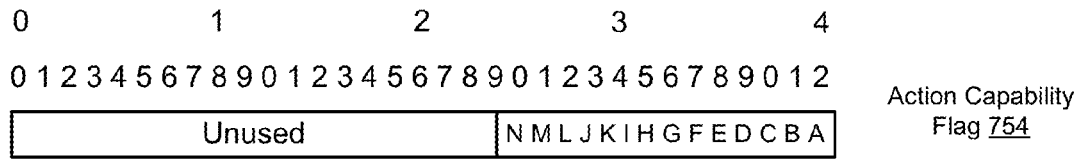
FIG. 10 depicts an exemplary action capabilities flag, according to various embodiments of the present invention.
Figure 11:
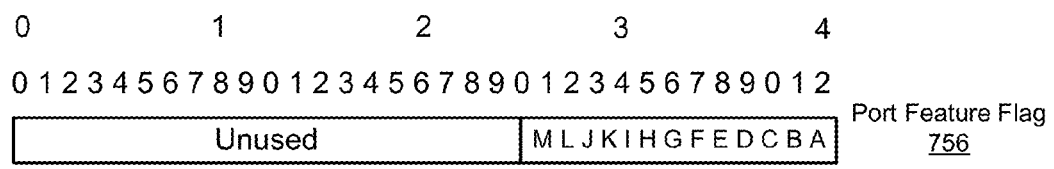
FIG. 11 depicts an exemplary port feature flag, according to various embodiments of the present invention.

In certain embodiments, connecting device 150 informs SDN controller 202 about its action capabilities and port features (e.g. which ports belong to L2/L3 network 100, which ports belong to SDN 200, etc.) via a feature reply message. The action capabilities flag may utilize an additional bit 'N,' according to various embodiments of the present invention. An exemplary action capabilities flag 754 is depicted in FIG. 10. Bit 'N' may be active to inform connecting device 150 that a received packet needs to be processed under the L2/L3 protocol. If Bit 'N' is not set, connecting device 150 processes the bit under the SDN protocol. A port feature flag (e.g. part of port descriptors in a feature reply message, etc.), may add a bit 'M,' according to various embodiments of the present invention. An exemplary port feature flag 756 is depicted in FIG. 11. For example, when bit 'M' is active, the port may be set as an L2/L3 port and when bit 'M' is not active, the port may be set as an SDN port.

In certain embodiments, connecting device 150 will send packet routing table 360, to SDN controller 150 so that SDN controller 202 can determine and install appropriate routes from SDN switches 350 to L2/L3 nodes 352. Therefore, in accordance with various embodiments of the present invention, an route update packet may be sent from connecting device 150 to SDN controller 202. An exemplary Route Update packet 758 is depicted in FIG. 13.

Figure 12:
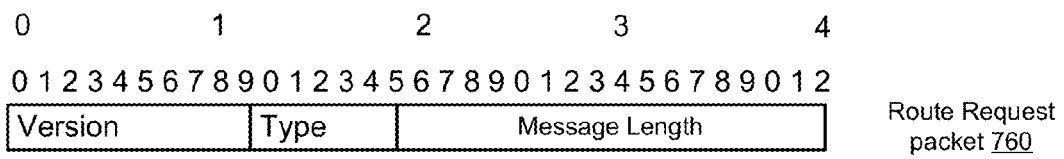
FIG. 12 depicts an exemplary SDN Route Prefix Request packet, according to various embodiments of the present invention.

In certain embodiments, SDN controller 202 sends an Route Request packet to connecting device 150 to receive the current packet routing table 360 from connecting device 150. An exemplary OpenFlow Route Prefix Request packet 760 is depicted in FIG. 12.

Figure 13:
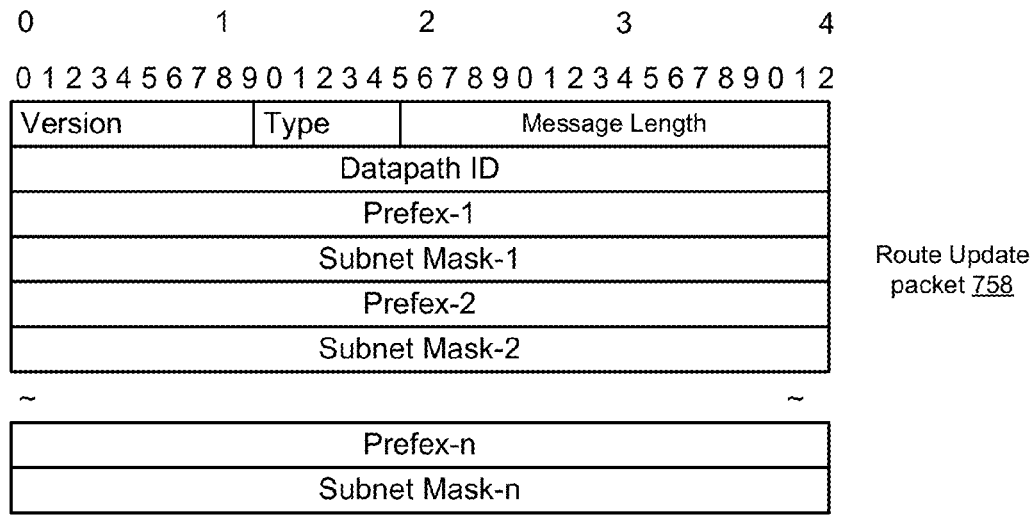
FIG. 13 depicts an exemplary SDN Route Prefix Update packet, according to various embodiments of the present invention.

Referring to the exemplary Route Update packet 758 depicted in FIG. 13, the Data path ID serves to identify the SDN switch 350 and is used for data path identification. The lower 48 bits are for the SDN switch MAC address and the top 16 bits are implementation specific. The prefix may be a 32-bit IPv4 destination reachable in the connecting device 150 packet routing table 360. The Mask may be a 32-bit subnet mask for the corresponding prefix in the connecting device 150 packet routing table 360. In certain instances (e.g. the packet is more than the maximum transmission unit of the link between connecting device 150 and the SDN controller 202, etc.), it may be necessary for the connecting device 150 to fragment the packet in order to pass it across to the SDN controller 202. As such, SDN controller 202 may subsequently manage the reassembly of the packet. The Route Update packet 758 will be received by SDN controller 202 whereby the SDN controller 202 will instruct that SDN controller 202 to update its packet routing table 360. An exemplary packet routing table 360 is shown in FIG. 14. SDN controller 202 may then query the packet routing table 360 so that it may determine and install routes from SDN switches 350 to L2/L3 nodes 352 via connecting device 150.

In certain embodiments, the packet may be routed to a Virtual Routing and Forwarding (VRF) instance and therefore the packet routing table 360 sent to the SDN controller 202 may additionally include a VRF Tag.

In certain embodiments, when an SDN switch 350 needs to send data to an L2/L3 destination it will construct a packet. The SDN switch 350 may send the packet to a Default Gateway, preferably the SDN controller 202. In other embodiments, however, another (e.g. neighboring, etc.) SDN switch 350 connected to the packet generating SDN switch 350 may receive the generated packet. The second SDN switch 350 may then send a packet-in to the SDN controller 202. SDN controller 202 strips the packet and checks the Inner Packet. Generally, when SDN controller 202 receives the generated packet it queries its packet flow table 362. If no matching table entry exists, the packet is destined for a L2/L3 destination and the packet is transmitted as described herein. If there is a matching packet flow table 362 entry the, packet should be processed under the SDN protocol. As such, SDN controller 202 determines, for example, a shortest path using a shortest path algorithm between the sender or generating switch 350 and a SDN destination. Using the shortest path algorithm, SDN controller 202 may query the packet flow table 362 to determine and install the route. SDN controller 202 may then send the determined flow path to the requisite SDN switches 350 in the determined path.

In certain embodiments, it is desired for data to be transmitted from SDN 200 to L2/L3 network 100. The SDN switch 350 may forward the packet to a Virtual Port "NORMAL," meaning that the SDN switch 350 will forward the packet to connecting device's 150 networking stack. The networking stack then processes the packet based upon the Packet Details. Alternatively, SDN controller 202 may install an entry on connecting device 150 with an Redirect Action, according to various embodiments of the present invention. When the Redirect Action is implemented, it identifies that the packet should be routed from the SDN switch 350 to L2/L3 network 100. The Redirect Action may be mapped to packet routing table 360 thereby triggering that the packet is to be redirected to L2/L3 network 100. Once connecting device 150 receives the packet it will be forwarded by connecting device 150 to the destination L2/L3 node 352.

In certain embodiments, for data flow from L2/L3 network 100 to SDN 200 a control path from SDN 200 to L2/L3 network 100 is implemented. In such embodiments, the SDN controller 202 becomes a default gateway for the L2/L3 nodes 352. Since an L2/L3 node 352 may only communicate to SDN switches 350 using the L2/L3 protocol, the L2/L3 node 352 cannot send the packet directly to the SDN switch 350. Rather, it may send the packet to the default gateway.

In certain embodiments the SDN controller 202 includes a Virtual Interface in the same subnet as SDN switches 350. The SDN controller 202 may receive a L2/L3 packet from connecting device 150. The SDN controller 202 may strip the packet to determine a destination (e.g. destination ip address, etc.). If the destination is in the same subnet was a virtual router interface of the SDN controller 202, the controller 202 may construct an ARP data packet and send it to all SDN switches 350 in SDN 200. (e.g. controller 202 send the ARP-Requests to all the edge ports, etc.). The SDN destination whose IP matches will respond to SDN controller 202 with ARP-Reply (e.g. a destination SDN switch 350 sends a Packet-In to the SDN controller 202, etc.). SDN controller 202 may begin sending a Flow Mod packet to install the route within SDN 200 (e.g. the shortest path, etc.).

In certain embodiments, an L2/L3 node 352 sends a packet destined for SDN 200. When the packet reaches the connecting device 150 the packet routing table 360 is checked. If the packet routing table 360 entry is present, the packet is processed accordingly under the L2/L3 protocol. If the packet routing table 360 entry is not present the packet flow table 362 is queried. For example, a special multicast/unicast address may be assigned which tells connecting device 150 to look into the packet flow table 362 for an existing route to the SDN destination. If no entry exists in the packet flow table 362 a Next Hop Address may be the Special Unicast/Multicast Address, and the packet may be sent to SDN controller 202 to determine a proper SDN destination as described herein. An exemplary special default route scheme to point to SDN controller 202 is shown in FIG. 15.

In certain embodiments, once the proper SDN destination is determined, connecting device 150 may update is packet flow table 362 so that in future data transfer to the known destination it does not need to use the SDN controller 202 as the default route. For example, a new packet flow table 362 entry with next hop as Special Multicast/Unicast Address or a Loopback address will be added. The next data packet to such destination may use the packet flow table 362 entry to send the packet to the SDN destination.

Whenever there is a modification/failover in SDN 200, an updated route may need to be recalculated and has to be updated accordingly in the SDN controller 202 and within the connecting device 150. Therefore connecting device 150 may also update the packet flow table 362 as well as the redistributed routes to/from SDN 200 and L2/L3 network 100.

Figure 17:
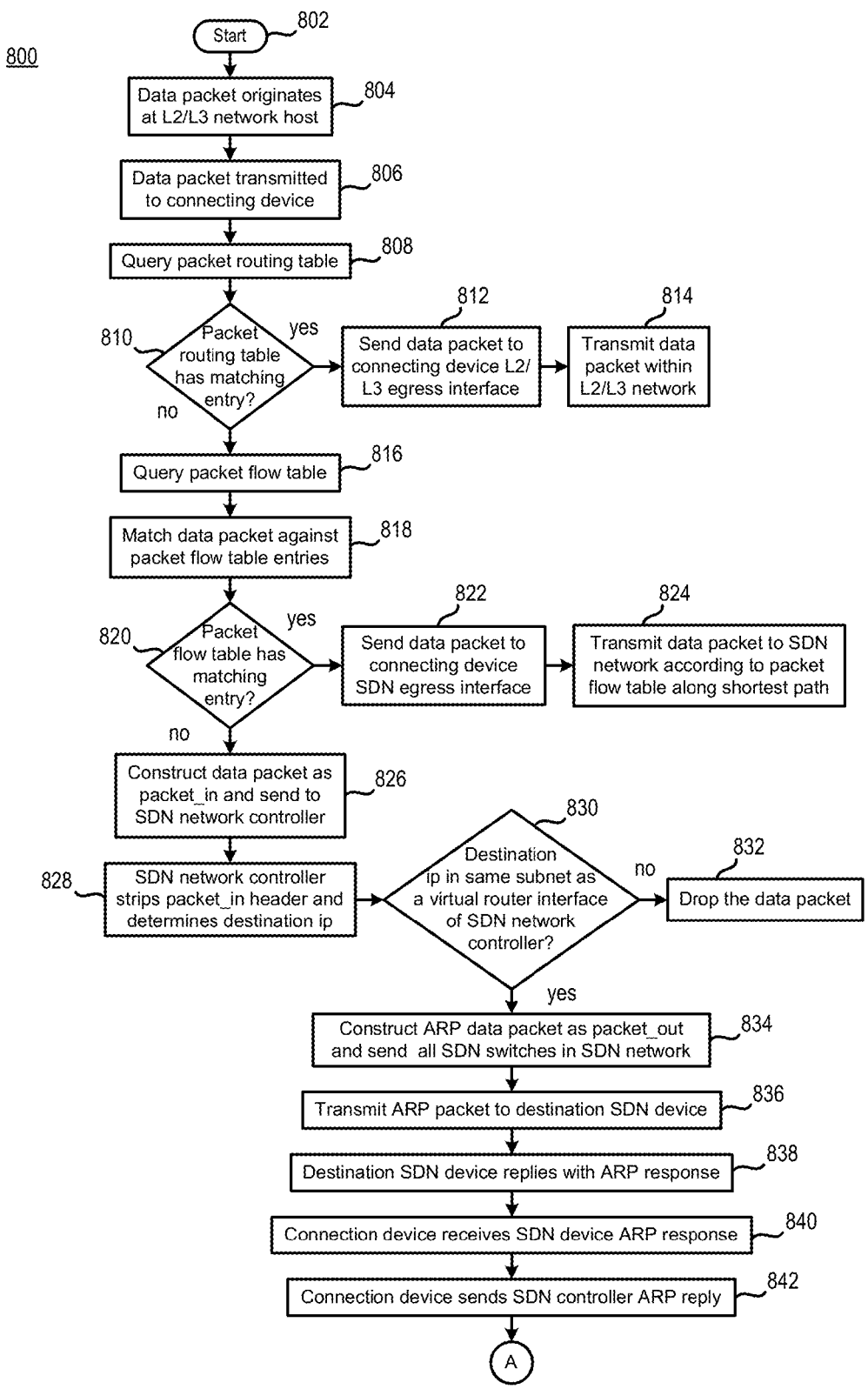
FIG. 17-FIG. 18 depicts an exemplary flow diagram of a process for transmitting packets from a L2/L3 network to a SDN, according to various embodiments of the present invention.
Figure 18:
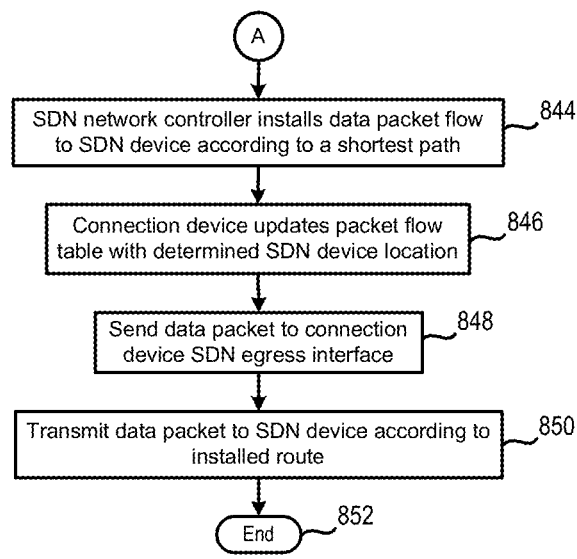

FIG. 17-FIG. 18 depicts an exemplary flow diagram of a process 800 for transmitting packets from L2/L3 network 100 to SDN 200, according to various embodiments of the present invention. Process 800 begins at block 802 and continues with at least one data packet originating, created, presently located, etc. at a L2/L3 host 351 (block 804) that then transmits the data packet to the L2/L3 network 100 wherein the data packet is routed to connecting device 150 (block 806). Connecting device 150 queries packet routing table 360 for a matching entry associated with the received data packet (block 810). If a matching entry is found, connecting device 150 sends the data packet to connecting device 150 L2/L3 egress interface (block 812) (e.g. L2/L3 port, etc.) and transmits the data packet within the L2/L3 network 100 (block 814). If a matching entry is not found, connecting device 150 queries packet flow table 362 (block 816) to potentially match the received data packet with an associated packet flow table 362 entry (block 818).

If a matching packet flow table 362 entry is found, connecting device 150 sends the data packet to connecting device 150 SDN egress interface (block 822) (e.g. SDN port, etc.) and transmits the data packet to SDN 200 according to the packet flow table 362 and a previously determined shortest path (block 824). If a matching packet flow table 362 entry is not found, connecting device 150 constructs a packet_in and sends the packet_in to SDN controller 202 (block 826) where, in turn, SDN controller 200 stips the packet_in and determines a SDN 200 destination identifier (e.g. IP address, etc.) (block 828).

Process 800 continues with the SDN controller 202 determining if the SDN 200 destination associated with the destination identifier is in the same subnet as a virtual router interface of the SDN controller 202 (block 830). If it is not the same subnet, the data packet is dropped. (block 832).

Process 800 continues with SDN controller 202 constructing an ARP broadcast as packet_out (block 834) and sending the ARP broadcast to all SDN devices in SDN 200 (block 836). The proper SDN device that shares identification information contained within the ARP broadcast replies to SDN controller 202 with an ARP response (block 838). The SDN controller 202 then sends the connecting device 150 an ARP message so as to communicate the identification of the proper SDN device (block 840) where in turn the connecting device 150 may send the SDN controller 202 an ARP reply (block 842).

Process 800 continues with the SDN controller 202 determines and installing a data path from connecting device 150 to the destination SDN device (e.g. shortest path, etc.) (block 844). Connecting device 150 updates packet flow table 362 with the destination SDN device information (e.g. adds destination SDN device location, etc.) (block 846). Connecting device 150 sends the data packet to connecting device SDN egress interface (block 848) and transmits the data packet to the SDN destination device along the installed route (block 850). Process 800 ends at block 850.

Figure 19:
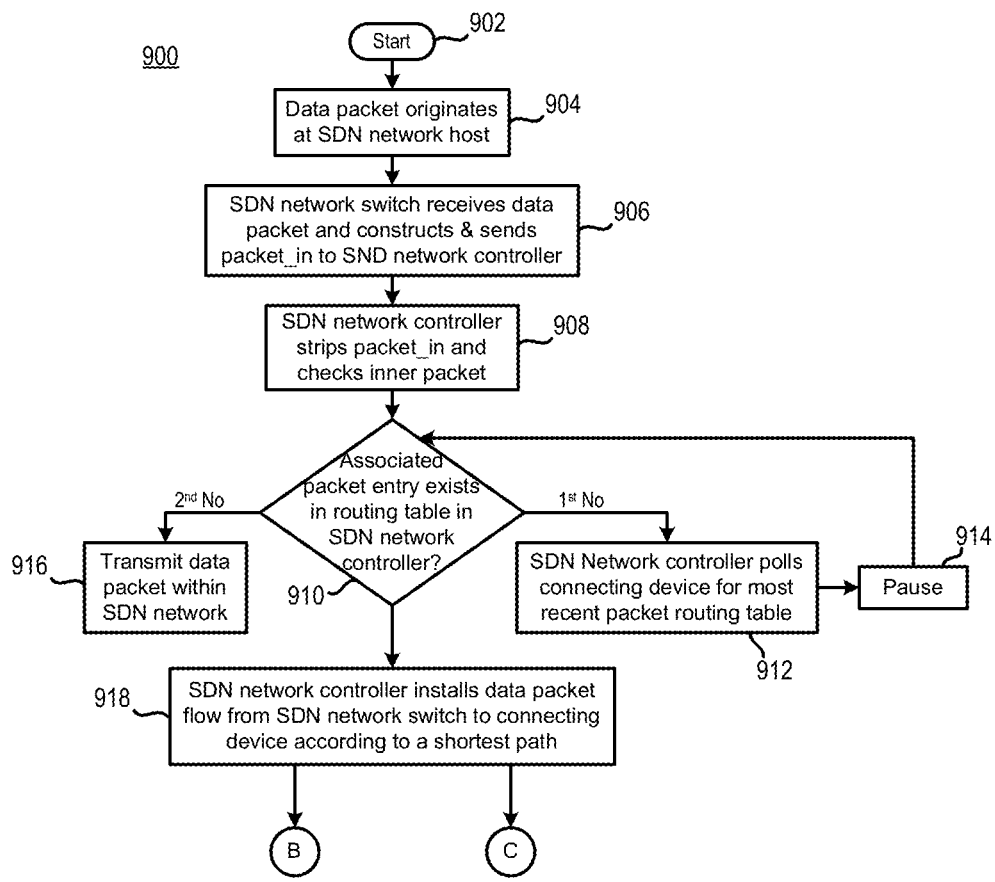
FIG. 19-FIG. 20 depicts an exemplary flow diagram of a process for transmitting packets from an SDN to a L2/L3 network, according to various embodiments of the present invention.
Figure 20:
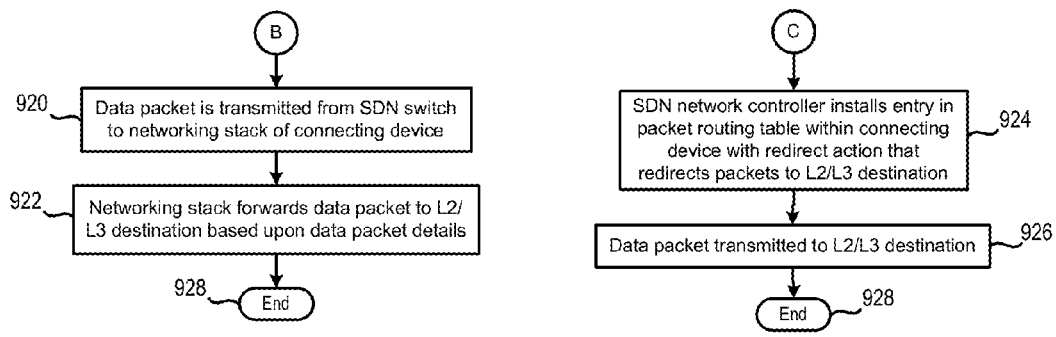

FIG. 19-FIG. 20 depicts an exemplary flow diagram of a process 900 for transmitting packets from SDN 200 to a L2/L3 network 100, according to various embodiments of the present invention. Process 900 begins at block 902 and continues with at least one data packet originating, created, presently located, etc. at a SDN host 351 (block 904) that then transmits the data packet to the SDN 200 wherein the data packet is routed to a SDN switch 350. The SDN switch 350 receives the data packet and constructs and sends packet_in to SDN controller 202 (block 906). The SDN controller 202 strips the packet_in and checks the inner packet (block 908).

Process 900 continues with SDN controller 202 querying its packet routing table 360 to determine if there is a matching entry (block 910). If there is no matching entry, SDN controller 202 polls connecting device 150 for a most recent packet routing table 360 (block 912). In certain embodiments, connecting device 150 may poll connecting device 150 at certain time intervals. Thus, SDN controller 202 may pause (914) and again poll connecting device 150 for a most recent packet routing table 360. If there is still no matching entry, the data packet is transmitted within SDN 200 (block 916).

Process 900 continues with SDN controller 202 determining and installing a path from SDN switch 350 to connecting device 150 (e.g. shortest path, etc.) (block 918). The data packet may be transmitted from SDN switch 350 to a networking stack of connecting device 150 (block 920) that in turn forwards the data packet to an L2/L3 destination based upon packet details (block 922). Alternatively, the SDN controller 202 may determine and install a packet routing table 360 entry within connecting device 150 with a redirect action that instructs connecting device to redirect the packet to the L2/L3 destination (block 924). The connecting device 150 then redirects the data packet to the L2/L3 destination according to the redirect action within packet routing table 360 (block 926). Process 900 ends at block 928.

Figure 21:
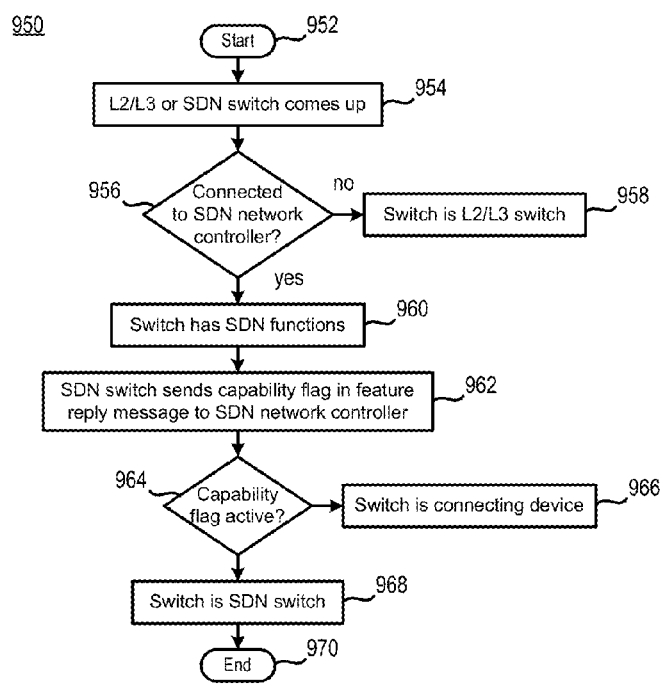
FIG. 21 depicts an exemplary flow diagram of a process for determining switch types of various switches within a network that includes L2/L3 switches, SDN switches, and a connecting switch.

FIG. 21 depicts an exemplary flow diagram of a process 950 for determining switch types of various switches within a network that includes L2/L3 switches, SDN switches, and a connecting switch. Process 950 begins at block 952 and continues with a switch within network 10 coming up (block 954). For example an L3/L3 switch (e.g. L2/L3 node 352, etc.) or a SDN switch 350 begins operating. It is determined if the network 10 switch is connected to SDN controller 202 (block 956). If the network 10 switch is not connected to SDN controller 202, the network 10 switch is an L2/L3 switch (block 958). If the network 10 switch is connected to SDN controller 202, the network 10 switch has SDN functionality (block 960) and may be either a connecting device 150 or SDN switch 350.

Process 950 continues with the network 10 switch sending a feature reply message with a capability flag set as active or inactive to SDN controller 202 (block 962) that determines whether the capability flag is active or inactive (block 964). If the capability flag is active, the network 10 switch is a connecting device 150 (block 966). If the capability flag is inactive, the network 10 switch is an SDN switch 350 (block 968). Process 950 ends at block 970.

The drawings are not necessarily to scale. The drawings are merely schematic representations, not intended to portray specific parameters of the invention. The drawings are intended to depict only exemplary embodiments of the invention. In the drawings, like numbering represents like elements.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A system to communicate between a first network and a second network, the system comprising:
    a first network comprising a first network protocol and a plurality of network nodes;
    a second network comprising a second protocol different from the first protocol, a plurality of network switches, and a controller, and;
    a connecting device connected to the first network and connected to the second network that transmits data from an originating network node to a destination network switch and transmits data from an originating network switch to a destination network node according to a packet routing table populated from the plurality of network nodes and a packet flow table populated from the plurality of network switches, the connecting device comprising a switch capability flag that indicates the connecting device has the capability to transmit data from the originating network node to the destination network switch and transmit data originating at the originating network switch to the destination network node.

2. The system of claim 1,
    wherein to transmit data from the first network to the second network, the destination network switch is determined by the controller constructing and transmitting an Address Resolution Protocol (ARP) broadcast message to the plurality of network switches, the controller receiving an ARP response from the destination network switch, and the controller instructing the connecting device to add an destination network switch entry to the packet flow table, and;
    wherein to transmit data from the second network to the first network, the destination network node is determined by the controller pointing to the connecting device.

3. The system of claim 1 wherein the first network is a Layer-2 or Layer-3 (L2/L3) network and the second network is a software defined network (SDN).

4. The system of claim 1 wherein the connecting device comprises a plurality of ports assigned to the first network by deactivating a port feature flag associated therewith and a plurality of ports assigned to the second network by activating a port feature flag associated therewith.

5. The system of claim 2 wherein the controller points to the connecting device by the controller determining destination node information comprised within the data to be transmitted from the second network to the first network, the controller querying a local copy of the packet routing table, and the controller installing a shortest path data flow from the originating network switch to the destination network node.

6. The system of claim 5 wherein the controller points to the connecting device by the controller further polling the connecting device for the packet routing table, the controller receiving and storing the packet routing table locally, and the controller querying the local routing table for an existing data packet entry associated with the data to be transmitted from the second network to the first network.

7. A method for communicating between a first network and a second network, the method comprising:
    populating a packet routing table comprised within a connecting device with one or more nodes comprised within the first network having a first network protocol;
    populating a packet flow table comprised within the connecting device with one or more switches comprised within the second network having a second network protocol different from the first network protocol;
    transmitting a packet from an originating network node comprised in the first network to the connecting device connected to the first network and connected to the second network,
        wherein transmitting the packet from the originating network node further comprises:
            querying, with the connecting device, the packet flow table to determine a destination network switch comprised in the second network;
            transmitting the packet from the connecting device to the destination network switch according to the packet flow table;
    transmitting a packet from an originating network switch comprised within the second network to a destination network node comprised within the first network;
        wherein transmitting the packet from the originating network switch further comprises:
            determining the destination network node with a controller comprised within the second network pointing to the connecting device.

8. The method of claim 7 wherein transmitting the packet from the originating network node further comprises further comprises:
    determining, with the controller, the destination network switch by the controller constructing and transmitting an Address Resolution Protocol (ARP) broadcast message to the plurality of network switches, receiving an ARP response from the destination network switch, and instructing the connecting device to add an destination network switch entry to the packet flow table.

9. The method of claim 7 wherein the first network is a Layer-2 or Layer-3 (L2/L3) network and the second network is a software defined network (SDN).

10. The method of claim 7 further comprising:
    activating a switch capability flag within the connecting device to indicate the connecting device has the capability to transmit data from the originating network node to the destination network switch and transmit data originating at the originating network switch to the destination network node.

11. The method of claim 7 further comprising:
assigning a plurality of connecting device ports to the first network by activating a port feature flag associated therewith, and;
assigning a plurality of connecting device ports to the second network by deactivating a port feature flag associated therewith.

12. The method of claim 7 wherein the controller pointing to the connecting device further comprises:
determining, with the controller, destination node information comprised within the data packet from the originating network switch;
querying, with the controller, a local copy of the packet routing table, and;
installing, with the controller, a shortest path data flow from the originating network switch to the destination network node.

13. The method of claim 12 wherein the controller pointing to the connecting device further comprises:
polling, with the controller, the connecting device for the packet routing table;
receiving, with the controller, the packet routing table from the connecting device;
storing, with the controller, the packet routing table locally, and;
querying, with the controller, the local routing table for an existing data packet entry associated with the data packet from the originating network switch.

14. A computer program product for communicating from a first network to a second network, the computer program product comprising a non-transitory computer readable storage medium having program code embodied therewith, the program code executable to:
populate a packet routing table comprised within a connecting device with one or more nodes comprised within the first network having a first network protocol;
populate a packet flow table comprised within the connecting device with one or more switches comprised within the second network having a second network protocol different from the first network protocol;
transmit a packet from an originating network node comprised in the first network to the connecting device connected to the first network and connected to the second network,
wherein the program code executable to transmit the packet from the originating network node further is executable to:
query, with the connecting device, the packet flow table to determine a destination network switch comprised in the second network;
transmit the packet from the connecting device to the destination network switch according to the packet flow table;
transmit a packet from an originating network switch comprised within the second network to a destination network node comprised within the first network;
wherein the program code executable to transmit the packet from the originating network switch is further executable to:
determine the destination network node with a controller comprised within the second network pointing to the connecting device.

15. The computer program product of claim 14 wherein the program code executable to transmit the packet from the originating network node further is further executable to:
determine, with the controller, the destination network switch by constructing and transmitting an Address Resolution Protocol (ARP) broadcast message to the plurality of network switches, receiving an ARP response from the destination network switch, and instructing the connecting device to add an destination network switch entry to the packet flow table.

16. The computer program product of claim 14 wherein the program code is configured to operate where the first network is a Layer-2 or Layer-3 (L2/L3) network and where the second network is a software defined network (SDN).

17. The computer program product of claim 14 wherein the program code is further executable to:
activate a switch capability flag within the connecting device to indicate the connecting device has the capability to transmit data from the originating network node to the destination network switch and transmit data originating at the originating network switch to the destination network node.

18. The computer program product of claim 14 wherein the program code is further executable to:
assign a plurality of connecting device ports to the first network by activating a port feature flag associated therewith, and;
assign a plurality of connecting device ports to the second network by deactivating a port feature flag associated therewith.

19. The computer program product of claim 14 wherein the program code that is executable to cause the controller to point to the connecting device is further executable to:
determine, with the controller, destination node information comprised within the data packet from the originating network switch;
poll, with the controller, the connecting device for a copy of the packet routing table;
receive, with the controller, the copy of the packet routing table from the connecting device;
store, with the controller, the copy of the packet routing table locally;
query, with the controller, the local routing table for an existing data packet entry associated with the data packet from the originating network switch, and;
install, with the controller, a shortest path data flow from the originating network switch to the destination network node.

* * * * *